United States Patent

Kuwayama

[11] Patent Number: 4,767,677
[45] Date of Patent: Aug. 30, 1988

[54] MULTI-LAYER CYLINDRICAL BEARING

[75] Inventor: Yukio Kuwayama, Yachiyo, Japan

[73] Assignee: NDC Co., Ltd., Chiba, Japan

[21] Appl. No.: 97,623

[22] Filed: Sep. 16, 1987

[30] Foreign Application Priority Data

Sep. 17, 1986 [JP] Japan .......................... 61-141353[U]
Apr. 24, 1987 [JP] Japan .......................... 62-61341[U]

[51] Int. Cl.$^4$ .............................................. B22F 3/00
[52] U.S. Cl. .................................... 428/551; 384/912; 384/913; 428/626; 428/681
[58] Field of Search ................ 384/912, 913; 428/551, 428/626, 681

[56] References Cited

U.S. PATENT DOCUMENTS 4,582,368  4/1986  Fujita et al. .......................... 384/912
4,666,787  5/1987  Bickle et al. .......................... 384/912

Primary Examiner—Stephen J. Lechert, Jr.
Attorney, Agent, or Firm—Bernard, Rothwell & Brown

[57] ABSTRACT

A multi-layer cylindrical bearing comprises an outer, backing layer (1a) of stainless steel, an intermediate layer (1b) of porous copper alloy formed by sintering copper alloy, and an inner, bearing layer (1c) of synthetic resin formed by impregnating and curing the resin over said intermediate layer.

7 Claims, 5 Drawing Sheets

MULTI-LAYER CYLINDRICAL BEARING

BACKGROUND OF THE INVENTION

This invention concerns a multi-layer cylindrical bearing.

Multi-layer cylindrical bearings used for wiper arms and carburetor bearings in automobiles normally have to withstand adverse conditions due to their outside installation. An example of this type of bearing, shown in the U.S. Pat. No. 2,691,814, is manufactured by sintering metal powder on carbon steel sheet so as to form a sintered layer, and then impregnating and curing a synthetic resin over the sintered layer to form a strip-shaped plate. This plate is then bent into a cylinder with the carbon steel on the outside forming a backing layer, and cut into desired length which are given a flange if necessary. Alternatively, the plate is cut into desired length before being bent into a cylinder. Finally, the outer surface is given an anti-rust plating of tin or zinc. This anti-rust plating is satisfactory as far as the surface of the backing layer is concerned.

There is still a small gap where the cylinder is joined, however, and the plating solution is not impregnated into the gap, so that this area is hardly plated. When the bearing is exposed to harsh conditions outdoors, therefore, rust starts to form at the joint of the backing layer. Rainwater causes this rust to spread to adjoining areas, finally preventing the bearing from functioning correctly.

SUMMARY OF THE INVENTION

An object of the present invention is to overcome these disadvantages.

The multi-layer bearing of this invention incorporates, as the backing layer, stainless steel, so that there is no rusting at the joint, thereby giving the bearing excellent weatherability. It is therefore very suitable for use in rotating and sliding parts of automobile wiper arms and carburetors.

DESCRIPTION OF THE EMBODIMENTS

Preferred embodiments of this invention will now be described with reference to the drawings.

Figure 1:
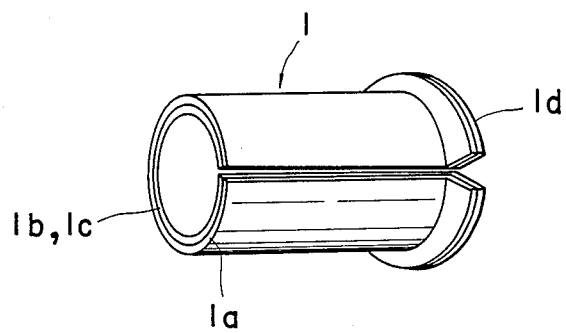
FIG. 1 is an oblique view of a preferred embodiment of the cylindrical bearing of this invention.
Figure 2:
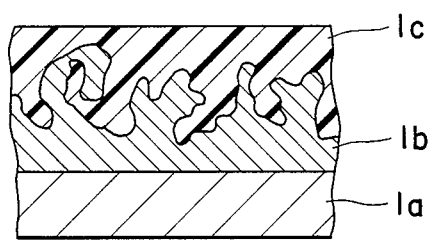
FIG. 2 is an enlarged view of the mutli-layer structure of the bearing of this invention.

FIGS. 1 and 2 illustrate one preferred embodiment of this invention. The area or joint where the cylinder is joined is exaggerated in FIG. 1. Multi-layer bearing 1 comprises a cylindrical stainless steel outer, backing layer 1a, an intermediate layer of porous copper sintered alloy 1b formed on the inner surface of backing layer 1a, and an inner, bearing layer of a synthetic resin (nylon, fluoroplastic, etc.) 1c formed on the inner surface of the intermediate layer 1b. This multi-layer cylindrical bearing is manufactured by the following process.

Intermediate layer 1b is first formed by sintering copper alloy powder of nearly uniform thickness on one side of backing layer 1a, which consists of fairly thin stainless steel sheet. A synthetic resin is then impregnated and hardened on intermediate layer 1b so as to form the bearing layer 1c such that protrusions on the latter enter the pores of intermediate layer 1b. The resulting multi-layer sheet is then rolled such that it forms a cylinder with backing layer 1a on the outside, and this is then cut into desired length. When the sheet is rolled into a cylinder, a joint is formed where two edges of the sheet abut. In a modification, the multi-layer sheet is first cut into the desired length and is then bent into a cylinder such that the backing layer 1a is on the outside. Finally, one end of multi-layer cylindrical bearing 1 is given a flange shape 1d if necessary by a press.

The multi-layer cylindrical bearing 1 so formed incorporates a layer of synthetic resin with self-lubricating properties, and therefore requires no other lubrication. Its backing layer 1a moreover is of stainless steel, and there is thus no rusting on the joint area.

Figure 3:
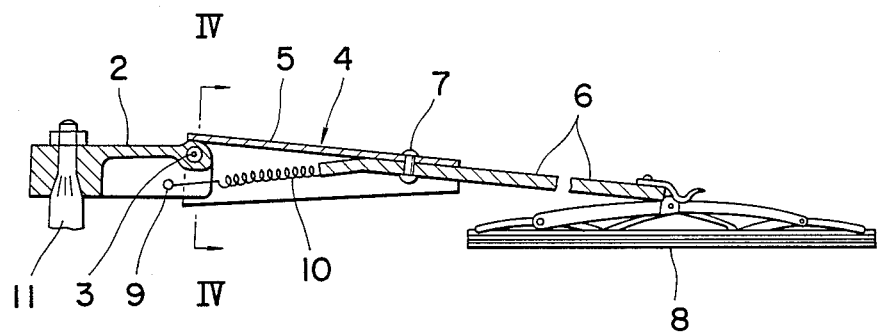
FIG. 3 is a sectional view of an embodiment of the cylindrical bearing of this invention when incorporated in a wiper arm.
Figure 4:
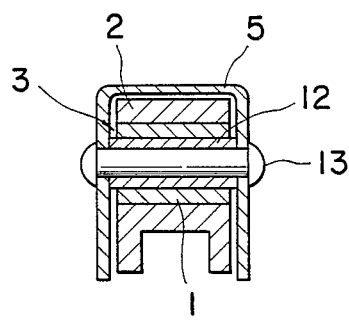
FIG. 4 is an enlarged view of FIG. 3 taken in section through the line IV—IV.
Figure 5:
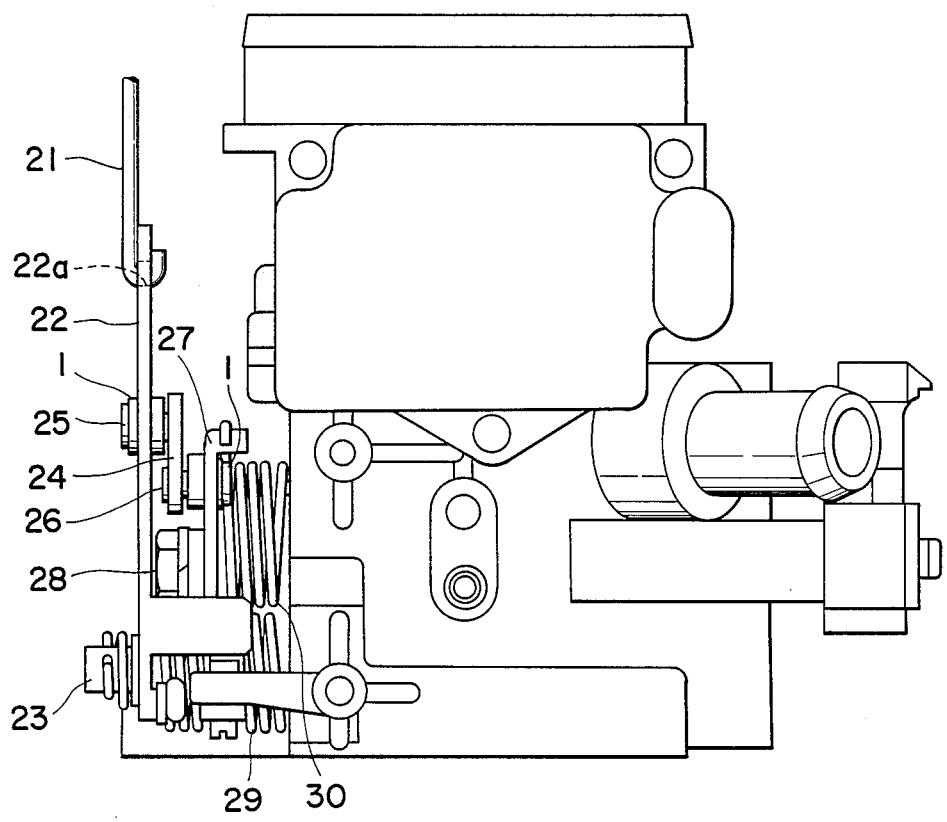
FIG. 5 is a front view of an embodiment of the cylindrical bearing of this invention when incorporated in a carburetor.
Figure 6:
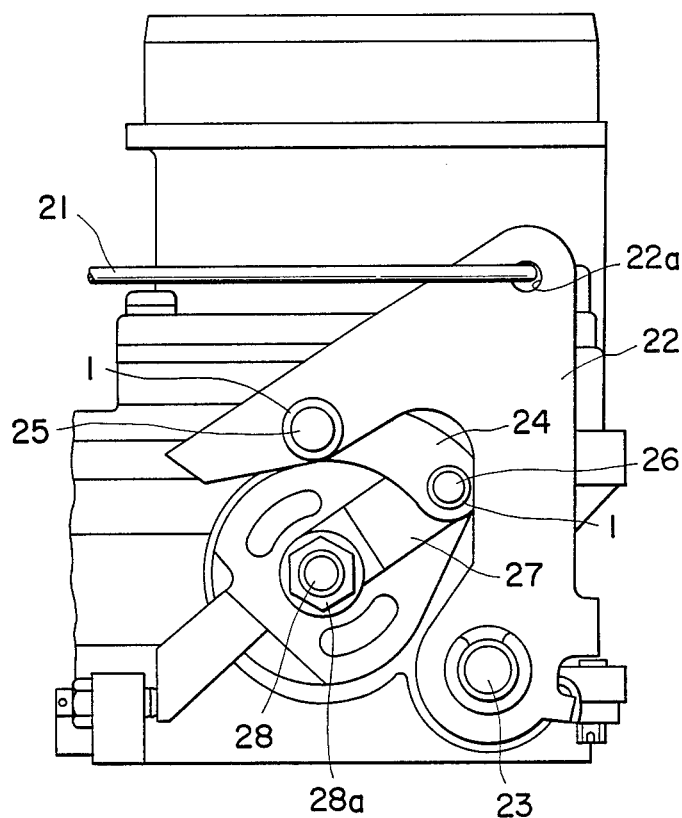
FIG. 6 is a profile of an embodiment of the cylindrical bearing of this invention when incorporated in a carburetor.

FIGS. 3 and 4 illustrates an example where the multi-layer cylindrical bearing 1 of this invention is applied in the rotating and sliding parts of a car wiper. In FIG. 3, 11 represents a drive shaft which is rotated back and forth about an axis by a wiper motor (not shown). The support arm 2 which is connected to the drive shaft 11 via a serrated joint is given back and forth swinging motion.

The base 5 of arm 4 is connected to the tip of support arm 2 via a bearing system 3, arm 4 being free to swing across the direction of swing of support arm 2. As shown in FIG. 4, base 5 which has a U-shaped cross-section and arm rod 6 are connected together by a rivet 7, and the wiper blade 8 is attached to the tip of arm rod 6. Further, one end of a spring 10 is secured to the base of arm rod 6, the other end being secured to pin 9 fixed on support arm 2 so as to bias arm 4 in one direction around bearing system 3. Wiper blade 8 is thus kept in close contact with the curved glass of the windscreen (not shown) as the arm 4 pivots about bearing system 3 while support arm 2 swings about a drive shaft 11.

Bearing system 3 comprises multi-layer bearing 1, which acts as an outer cylinder pressure-inserted in support arm 2, and an inner cylinder 12 acting as a shaft secured by bridging via rivet 13 to the base 5 of arm 4. Inner cylinder 12 is inserted in multi layer bearing 1 such that it can rotate and slide freely. The axis of inner cylinder 12 is almost perpendicular to the axis of drive shaft 11.

With a wiper arm incorporating a bearing system 3 of the above structure, arm 4 pivots about the system 3 when wiper blade 8 wipes the curved surface of the glass windscreen. At the same time, inner cylinder 12 of bearing system 3 rotates and slides in contact with the bearing layer 1c consisting of the synthetic resin of cylindrical bearing 1. There is therefore no need for lubricating oil, no soiling of the surrounding area due to oil leakage, and good lubrication is maintained over a long period of time. Also, because the backing layer 1a of the multi-layer cylindrical bearing 1 shown in FIG. 2 is of stainless steel, there is no rusting due to rain or salt spray, and the lubricating performance of bearing system 3 is not impaired by rust.

Figure 7:
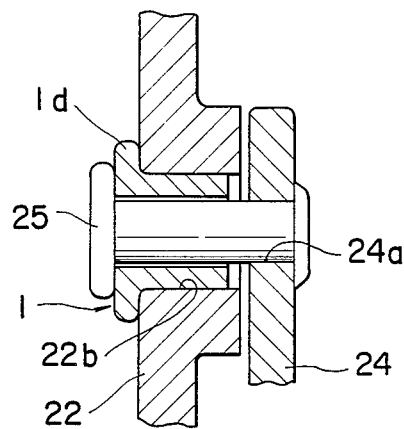
FIG. 7 and FIG. 8 are enlarged sectional views of the positions where the cylindrical bearing is incorporated in a carburetor.
Figure 8:
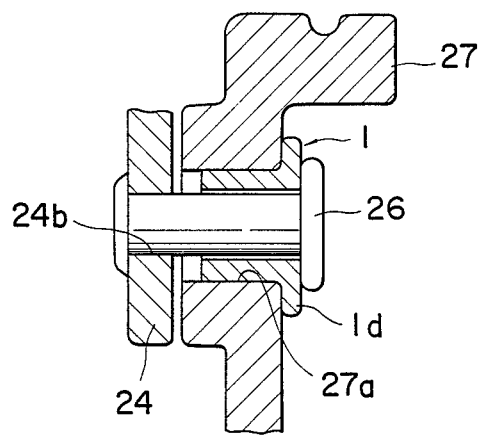

FIGS. 5–8 illustrate the application of the multi-layer cylindrical bearing of this invention to the moving parts of a carburetor. 21 (FIG. 6) is a wire rope which is part of a control mechanism, one end of which is connected to a through-hole 22a at the top of the angle-shaped action link 22, and the other end to the axle pedal of the driver's compartment (not shown). One end of the angle-shaped action link 22 is rotatably supported by pin 23 fixed to the body of the carburetor. The multi-layer cylindrical bearing 1 with flange 1d is pressed into the through-hole 22b at the other end of action link 22 (FIG. 7). A connecting pin 25, which passes through hole 24a placed at one end of the connecting link 24 so as to rotatably engage with said bearing 1, and of which the end is caulked, connects action link 22 with one end of connecting link 24. 27 is a lever of which the base is screwed on to the end of shaft 28 of the intake valve by a nut 28a. The multi-layer cylindrical bearing 1 with flange 1d is pressure-inserted in through-hole 27a at the end of lever 27 (FIG. 8). A pin 26, which passes through hole 24b in connecting link 24 so as to rotatably engage with said bearing 1, and of which the end is caulked, connects lever 27 with the other end of connecting link 24. 29 and 30 are recoil springs.

When wire rope 21 is stretched, action link 22 rotates about pin 23. The motion of pin 25 activates lever 27 through connecting link 24 and pin 26, which rotates shaft 28 of the intake valve and opens the valve.

Thus, if the multi-layer cylindrical bearing 1 with flange 1d is used for the rotating and sliding parts of the link mechanism of the carburetor, there is no rusting of the bearing, and as the heads of pins 25 and 26 rotate and slide with the flange 1d, a smooth action is obtained.

As will be understood from the above, this invention has the following advantages:

(1) As the multi-layer cylindrical bearing consists of a cylinder of several layers which has been formed either by first bending into a cylinder and then cutting into desired length or by first cutting into the desired length and then bending into a cylinder, and given a flange if necessary, it is easy to manufacture.

(2) As the bearing layer consists of a resin with self-lubricating properties, there is no need for lubricating oil, and frictional resistance is kept low over a long period of time.

(3) As the backing layer is of stainless steel, there is no rusting of the joint even when the bearing is used under harsh conditions in the open air. There is therefore no soiling of adjacent areas, and no rusting of the shaft engaged with the bearing which would impair its performance.

What is claimed is:

1. A multi-layer cylindrical bearing comprising a cylindrical multi-layer sheet comprising
   an outer backing layer of stainless steel,
   an intermediate layer of porous copper alloy and
   an inner bearing layer of synthetic resin, said synthetic resin being impregnated into said intermediate layer,
   said bearing including a joint where two edges of said sheet abut.

2. The multi-layer bearing of claim 1 wherein one end of said cylinder has a circumferential flange.

3. A wiper comprising a wiper arm, a support arm, and a cylindrical bearing which rotatably connects said wiper arm to said support arm, said cylindrical bearing comprising a cylindrical multi-layer sheet comprising
   an outer backing layer of stainless steel,
   an intermediate layer of porous copper alloy, and
   an inner bearing layer of synthetic resin, said synthetic resin being impregnated into said intermediate layer,
   said bearing including a joint where two edges of said sheet abut.

4. A wiper comprising:
   a wiper arm,
   a support arm having a base which is U-shaped in cross-section,
   a cylindrical bearing which rotatably connects said base of said wiper arm to said support arm, said cylindrical bearing comprising a cylindrical multi-layer sheet comprising
   an outer backing layer of stainless steel,
   an intermediate layer of porous copper alloy, and
   an inner bearing layer of synthetic resin, said synthetic resin being impregnated into said intermediate layer,
   said bearing including a joint where two edges of said sheet abut,
   said outer backing layer of said bearing being pressure-inserted into said support arm,
   said wiper arm being free to swing across the direction of swing of said support arm,
   a wiper blade being attached to said wiper arm,
   a spring extending to said support arm for biasing said wiper arm in one direction extending to said support arm and
   a shaft which is rotatably inserted in said bearing, said shaft being secured by bridging said base of said wiper arm.

5. A carburetor comprising:
   a carburetor body including an intake valve,
   an angle-shaped action link,
   a support pin fixed to said carburetor body, said support pin being inserted in a hole in one end of said action link, thereby rotatably supporting said action link,
   a connecting link,
   a first connecting pin attached to said connecting link,
   a first cylindrical bearing,
   said first cylindrical bearing being inserted through a hole in the other end of said action link so that said first cylindrical bearing rotatably engages said first connecting pin,
   a lever attached to said intake valve,
   a second connecting pin attached to said connecting link,
   a second cylindrical bearing,
   said second cylindrical bearing being inserted through a hole in said lever so that said second cylindrical bearing rotably engages said second connecting pin,
   said first cylindrical bearing comprising a cylindrical multi-layer sheet comprising:
   an outer backing layer of stainless steel,
   an intermediate layer of porous copper alloy, and
   an inner bearing layer of synthetic resin, said synthetic resin being impregnated into said intermediate layer, said first cylindrical bearing including a joint where two edges of said sheet abut.

6. A carburetor comprising:
a carburetor body,
an angle-shaped action link,
a support pin fixed to said carburetor body, said support pin being inserted into a hole at one end of side action link, thereby rotatably supporting said action link,
a connecting link,
a first connecting pin attached to said connecting link,
a first cylindrical bearing,
said first cylindrical bearing being inserted through a hole in the other end of said action link so that said first cylindrical bearing rotatably engages said first connecting pin,
a lever attached to the intake valve of said carburetor body,
a second connecting pin attached to said connecting link,
a second cylindrical bearing,
said second cylindrical bearing being inserted through a hole in said lever so that said second cylindrical bearing rotatably engages said second connecting pin,
said second cylindrical bearing comprising a cylindrical multi-layer sheet comprising:
an outer backing layer of stainless steel,
an intermediate layer of porous copper alloy,
an inner bearing layer of synthetic resin, said synthetic resin being impregnated into said intermediate layer,
said second cylindrical bearing including a joint where two edges of said sheet abut.

7. The carburetor of claim 5, wherein said first cylindrical bearing comprises:
a cylindrical multi-layer sheet comprising
an outer backing layer of stainless steel,
an intermediate layer of porous copper alloy, and
an inner bearing layer of synthetic resin, said synthetic resin being impregnated into said intermediate layer,
said first cylindrical bearing including a joint where two edges of said sheet abut.

* * * * *

UNITED STATES PATENT AND TRADEMARK OFFICE
CERTIFICATE OF CORRECTION

PATENT NO. : 4,767,677

DATED : August 30, 1988

INVENTOR(S) : Yukio Kuwayama

It is certified that error appears in the above-identified patent and that said Letters Patent is hereby corrected as shown below:

Column 5, Line 7, Claim 6, "side" should be --said--.

Signed and Sealed this

Twelfth Day of September, 1989

Attest:

DONALD J. QUIGG

Attesting Officer

Commissioner of Patents and Trademarks